R. E. TROMBLEY.
GATE.
APPLICATION FILED SEPT. 19, 1908. RENEWED JUNE 1, 1910.

965,420.

Patented July 26, 1910.
2 SHEETS—SHEET 2.

Inventor
Richard E. Trombley.

Witnesses

By

Attorneys

UNITED STATES PATENT OFFICE.

RICHARD E. TROMBLEY, OF PENDLETON, OREGON.

GATE.

965,420.  Specification of Letters Patent.  Patented July 26, 1910.

Application filed September 19, 1908, Serial No. 453,717.  Renewed June 1, 1910.  Serial No. 564,458.

*To all whom it may concern:*

Be it known that I, RICHARD E. TROMBLEY, a citizen of the United States, residing at Pendleton, in the county of Umatilla, State of Oregon, have invented certain new and useful Improvements in Gates; and I do hereby declare the following to be a full, clear, and exact description of the invention, such as will enable others skilled in the art to which it appertains to make and use the same.

This invention relates to improvements in gates, more particularly to the larger forms of gates known as farm gates, and of the class adapted to be opened or closed from a distance, so that a person riding in a vehicle or on horseback can open or close the gate without alighting, and has for one of its objects to simplify and improve the construction and increase the efficiency and utility of devices of this character.

Another object of the invention is to provide a simply constructed gate arranged to be tilted bodily and which may be opened and closed from a distance at either side, and with means for counterbalancing the gates so that the operation of tilting is simplified and the power required to operate them decreased.

With these and other objects in view the invention consists in a supporting frame having the gate or gates connected thereto and arranged to be tilted, a countershaft mounted for oscillation upon the frame, coupling means between the countershaft and gates, and means whereby the shaft may be operated to cause the opening or closing of the gates.

Figure 1:
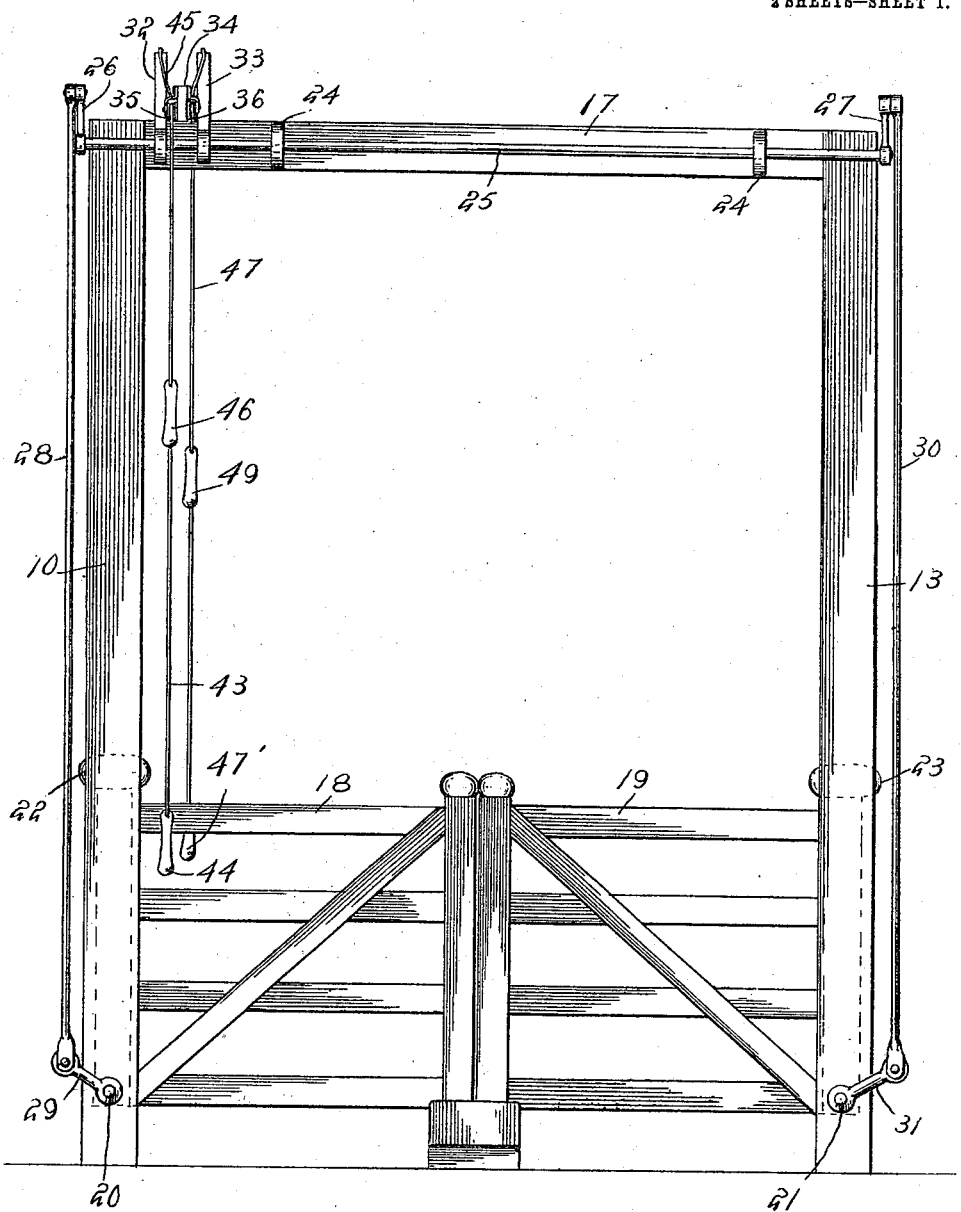
Figures 2, 3:
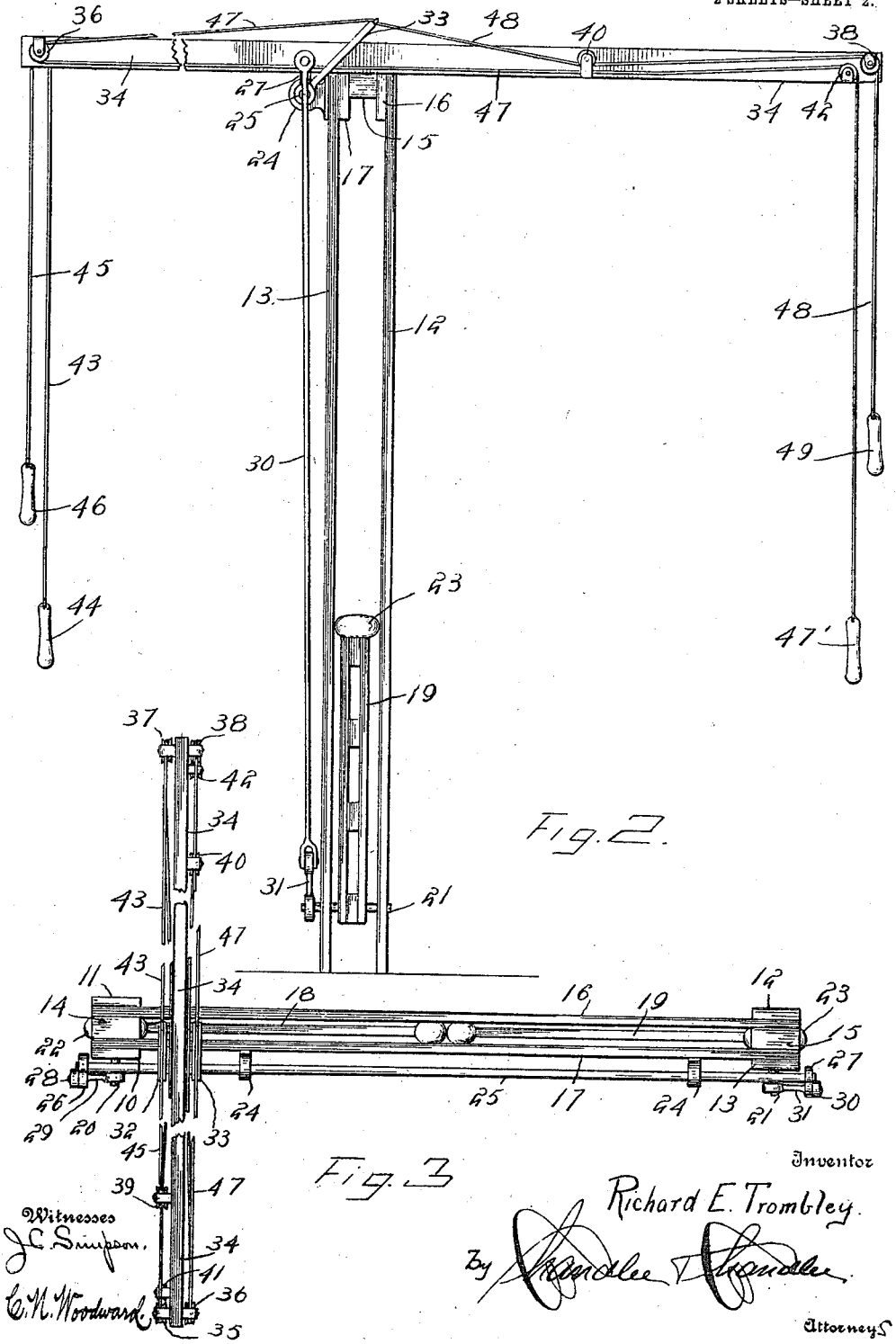

The invention further consists in certain novel features of construction as hereafter shown and described and then specifically pointed out in the claim, and in the drawings illustrative of the preferred embodiment of the invention, Figure 1 is a side elevation of the improved gates together with the supporting frame and the operating mechanism. Fig. 2 is an end elevation of the improved gate and its supporting frame and a side elevation of the gate operating mechanism. Fig. 3 is a plan view of the members shown in Figs. 1 and 2.

The improved apparatus comprises a supporting frame consisting of spaced vertical posts 10—11 arranged at one side of the gate-way opening and spaced posts 12—13 arranged at the opposite side of the gateway opening, the posts 10—11 coupled by a transverse member 14 and the posts 12—13 connected by a transverse member 15 near the upper ends, the posts 11—12 being likewise coupled by a member 16 and the posts 10—13 coupled by a similar member 17, the two members 16—17 being spaced apart above the gate-way opening and forming the "head" element of the frame. The posts 10—11 12—13, the members 16—17 may be of any required size and material, but will generally be of wood of ordinary joist material of any required size and adapted to gate-way openings of any required dimensions.

The improved device may be arranged for a single gate or a double gate as may be preferred, but for the purpose of illustration is shown applied to an ordinary double gate of the farm gate construction, the gates represented respectively at 18—19, and may be of any required form or of any required construction. For the purpose of illustration the gates are shown of the ordinary form with vertical end members and spaced longitudinal rails and diagonal braces. The gate 18 is mounted to swing vertically upon a shaft 20 extending through the posts 10—11, while the gate 19 is similarly mounted to swing upon a shaft 21 extending through the posts 12—13, the shafts extending respectively through the gates at their outer lower corners, as shown, so that when the gates are tilted upwardly in the act of opening, the gate 18 will swing between the posts 10—11 and the gate 19 will swing between the posts 12—13, as will be obvious. The gate 18 is provided with a counterbalance weight 22, while the gate 19 is provided with a counterbalance weight 23, to reduce the power required to operate the gates, as hereafter explained.

Mounted for oscillation in bearings 24 upon the upper portion of the frame is a shaft 25 carrying crank arms 26—27 at the ends, the crank arm 26 coupled by a rod 28 to a crank arm 29 on the shaft 20, while the crank arm 27 is coupled by a rod 30 to a crank arm 31 on the shaft 21. By this means it will be obvious that the oscillation of the shaft 25 will cause the depression of the rods 28—30 with the result of tilting the gates 18—19 upon their shafts 20—21 and placing them in open position, the counterbalances 22—23 materially assisting in the operation and lessening the power required to actuate the shaft.

Connected to the shaft 25 are two arms 32—33, and connected to these arms is a plurality of pull cords or cables arranged to be operated from a distance so that a person approaching in a vehicle or on horse back can operate the gates without alighting, the approved arrangement of the pull cords as shown comprising a relatively long beam 34 connected across the frame work and extending at right angles thereto but in the same direction as the line of the road way. The beam 34 will preferably be arranged near the posts 10—11 or 12—13, so that the operating devices will be located at one side of the road way and not interfere with the passage of the vehicles, and for the purpose of illustration the beam is shown located near the posts 10—11 and between the arms 32—33 so that the arms extend at opposite sides of the beam.

Attached to the beam at opposite sides near the ends are guide pulleys 35—36—37—38, while a guide pulley 39 is attached to the beam 34 at one side and between the shaft 25 and the guide pulley 35, while a similar guide pulley 40 is connected to the opposite side of the beam between the shaft 25 and the guide pulley 38. A guide pulley 41 is located near the pulley 35 upon the same side of the beam 34, while a similar guide pulley 42 is located near the pulley 38 and at the same side of the beam. The guide pulleys 36—38—40 and 42 are thus located upon one side of the beam 34 while the guide pulleys 35—37—39 and 41 are located upon the opposite side of the beam.

A pull cord or cable 43 is connected at one end to the free end of the arm 32 and extends thence around the guide pulley 37 and thence alongside of the beam 34 and around the guide pulley 41 and extends downwardly and terminates in a hand grip 44, while another pull cord or cable 45 is connected at one end to the free end of the arm 32 and extends thence beneath the guide pulley 39 and around the guide pulley 35 and terminates in a hand grip 46. Another pull cord or cable 47 is connected at one end to the free end of the arm 33 and extends thence around the guide pulley 36 and thence alongside the beam 34 and around the guide pulley 42 and terminates in a hand grip 47', while another pull cord or cable 48 is connected at one end to the free end of the arm 33 and extends thence beneath the guide pulley 40 and around the guide pulley 38 and terminates in a hand grip 49. The hand grips 44—46 are located near each other at one end of the beam while the hand grips 47'—49 are located near the opposite end of the beam 34, as shown.

By this arrangement if a person approaches the gates from either side the latter may be readily opened by pulling outdownwardly upon one of the hand grips as the person passes through the gate-way opening and the gates may be closed by pulling downwardly upon the other hand grip, as will be obvious. Thus if a vehicle or rider approaches from the side having the handles 44—46 a downward pull upon the handle 46 will cause the pull cable 45 to rock the shaft 25 with the result of simultaneously depressing the crank arms 29—31 and tilting the gates into open position. Then as the rider or driver passes through the gates, a downward pull upon the handle 49 will cause the pull cable 48 to act upon the arms 33 and rock the shaft 25 in the opposite direction, with the result of elevating the crank arms 29—31 and causing the closing of the same.

The improved device is simple in construction, can be inexpensively manufactured, and readily adapted without material structural changes to gates of various sizes and to gates of various materials.

While the drawings show the preferred embodiment of the invention, it will be obvious that changes may be made in the structure within the scope of the appended claims without departing from the principle of the invention or sacrificing any of its advantages.

What is claimed is—

In a gate structure, a frame including spaced vertical members located at one side of a gateway opening, a lower shaft extending through said vertical frame members near the ground, a gate connected rigidly to said shaft between said vertical members, a crank arm carried by said lower shaft at one end, a beam carried by said frame at its upper end and extending at right angles to the path of said gate, an upper shaft mounted for oscillation upon said frame near the beam, a crank arm carried by said upper shaft, a rod connecting the cranks of the upper and lower shafts, a lever arm carried by said upper shaft, a plurality of cable guide sheaves carried by said beam, and cables connected to said lever arm and leading over said guide pulleys.

In testimony whereof, I affix my signature, in presence of two witnesses.

RICHARD E. TROMBLEY.

Witnesses:
JOHN A. GIBSON,
WILLARD OSBORN.